United States Patent
Camp et al.

(10) Patent No.: US 7,517,831 B2
(45) Date of Patent: Apr. 14, 2009

(54) PUMICE STONE WITH A CARBON CONTENT, PROCESS FOR ITS PRODUCTION AND ITS APPLICATIONS

(75) Inventors: Jean-Pierre Camp, Paris (FR); Serge Bensaid, Rond-Point de Lançon (FR)

(73) Assignee: Sem Stone, Paris (FR)

( * ) Notice: Subject to any disclaimer, the term of this patent is extended or adjusted under 35 U.S.C. 154(b) by 194 days.

(21) Appl. No.: 11/569,678

(22) PCT Filed: May 27, 2005

(86) PCT No.: PCT/FR2005/001313

§ 371 (c)(1),
(2), (4) Date: Apr. 6, 2007

(87) PCT Pub. No.: WO2005/118483

PCT Pub. Date: Dec. 15, 2005

(65) Prior Publication Data

US 2007/0267350 A1 Nov. 22, 2007

(30) Foreign Application Priority Data

May 28, 2004 (FR) .................................. 04 05786

(51) Int. Cl.
*C01B 31/08* (2006.01)
*B01D 15/00* (2006.01)

(52) U.S. Cl. .................. 502/416; 210/691; 210/925
(58) Field of Classification Search ................ 502/416; 210/660, 691, 925

See application file for complete search history.

(56) References Cited

U.S. PATENT DOCUMENTS

| 5,397,755 | A | 3/1995 | Parker et al. |
| 5,518,910 | A | 5/1996 | Parker et al. |
| 7,341,661 | B2 * | 3/2008 | Sansalone .................. 210/263 |
| 7,354,542 | B1 * | 4/2008 | Girgin .......................... 264/122 |

FOREIGN PATENT DOCUMENTS

| DE | 1 941 199 | | 2/1971 |
| DE | 31 42 275 | A | 5/1983 |
| FR | 2 065 206 | | 7/1971 |
| FR | 2 105 752 | A | 4/1972 |
| JP | 56 078628 | A | 6/1981 |
| JP | 11 076811 | A | 3/1999 |
| WO | 96/02602 | A1 | 2/1996 |

* cited by examiner

*Primary Examiner*—Chester T Barry
(74) *Attorney, Agent, or Firm*—Pearne & Gordon LLP

(57) ABSTRACT

This pumice stone, which has a carbon content of between 5 and 15% by weight, is capable of adsorbing hydrocarbons but is hydrophobic. It can be applied in decontaminating a sheet of water.

7 Claims, No Drawings

PUMICE STONE WITH A CARBON CONTENT, PROCESS FOR ITS PRODUCTION AND ITS APPLICATIONS

The present invention relates to pumice stones, to a process for their production and to their applications.

Pumice stone is a light-coloured glassy volcanic rock. It exhibits entirely exceptional characteristics in the form of closed internal cells and open external cells. It is highly porous, hence its low density; its appearance is that of a sponge.

Pumice stone is resistant to cold, to fire and to bad weather and it is devoid of water-soluble salts.

It is a silicoaluminate which comprises basalt particles (ash) which can block the pores thereof.

FR 2 105 752 A discloses a pumice stone having a particle size of 0.5 to 4 mm and a density of 350 kg/m$^3$.

DE 1941199A provides for the adsorption of oil by pumice stone.

The present invention is targeted at a novel pumice stone.

This novel pumice stone has a carbon content of between 5 and 15% by weight, preferably of between 10 and 13% by weight, and is characterized in that it has a particle size of between 3 and 8 mm and a density of less than or equal to 570 kg/m$^3$ and greater than 500 kg/m$^3$.

The carbon content is determined by total combustion by the Dumas method by conversion of the carbon to $CO_2$ and quantitative determination of the $CO_2$.

This pumice stone, which comprises carbon in the adsorbed state, has the noteworthy property of being able to adsorb hydrocarbons but of being hydrophobic. It is therefore of particular use in decontaminating sheets of water contaminated by oil. It is even more useful since, after having been used to adsorb hydrocarbons, it can be removed from the sheet of water and ignited in order to calcine it, so that the adsorbed hydrocarbons are destroyed and so that the carbon black produced becomes attached to the walls of the pores and renders the pumice stone again hydrophobic and ready to be reused to decontaminate the sheet of water.

The choice is preferably made, for the above-mentioned application, of a pumice stone with a particle size of less than 6 mm and with an $SiO_2$ content ranging from 60 to 70% by weight and an $Al_2O_3$ content of approximately 17% by weight, the remainder being composed of heterogeneous products. A pumice stone of this type having a carbon content according to the invention has a density of less than or equal to 570 kg/m$^3$. The pumice stone according to the invention has a density of greater than 500. By having a particle size of between 3 and 8 mm and preferably a mean particle size of 6 mm, a better specific surface is offered for the adsorption of hydrocarbons or in a contaminated sheet of water and the adsorption of these hydrocarbons is better. On taking a pumice stone having the $SiO_2$ and $Al_2O_3$ contents measured above, the density indicated is obtained, which means the pumice stone floats on the surface of the sheet of water. Its water line is high. It is therefore more effective in adsorbing hydrocarbons which are spread at the surface of a sheet of water and it is easier to gather up after the adsorption has taken place.

Experience has shown that it is best to place, on the sheet of water, a thickness of pumice stone of between 1 and 4 cm and in particular of 3 cm, which gives an adsorption yield of 30% of the volume of hydrocarbon adsorbed in three minutes and of 80% in half an hour. The pumice stone according to the invention is dispersed over the contaminated sheet of water in any appropriate way, for example by hand, using a shovel or using a dry route or wet route projecting device.

The pumice stone which has adsorbed hydrocarbons can be gathered together using a skimmer, a recovery net or a hydraulic extractor or in any other way.

After having gathered up the hydrocarbon-laden pumice stone, it can be incinerated on the spot or can be treated ashore under the direction of the harbourmaster's office or in heating devices or devices for the production of steam for the manufacture of energy.

Regeneration by ignition of the hydrocarbons takes place to 100%.

The pumice stone according to the invention can be prepared in a very simple way by causing the pumice stone to adsorb hydrocarbons and by then igniting the pumice stone in order to incinerate the hydrocarbons, which leaves carbon black lining the pores and giving the desired carbon content. It is possible preferably first to free the pumice stone from the fines, basalt, magnetite and volcanic ash which obstruct the pores thereof. This can be carried out by water washing with at least 20% by weight of water by projecting jets of water through a sieve on which the pumice stone is deposited. The jets lift up the grains of pumice stone, penetrate into the pores and free them from the impurities, which fold back and pass through the sieve, which provides for the separation of the purified pumice stone. This pumice stone can subsequently be dried in a dryer, for example in a dryer heated by a stream of hot water, for example between 200 and 250° C., until the water content of the pumice stone is less than or equal to 10% by weight. In particular, pumice stones having a moisture content of less than 2% by weight are commonly obtained.

The adsorption of hydrocarbons in order to prepare the pumice stone according to the invention or in order to subsequently use it for the decontamination can be carried out at a rate of at least 20% by volume of hydrocarbons adsorbed up to saturation.

Finally, the invention is targeted at a process which consists in spreading a pumice stone according to the invention over the sheet of water, in leaving it there for between two minutes and eight hours and preferably between three minutes and two hours, and in then gathering up the pumice stone and igniting it in order to incinerate therefrom the hydrocarbons which it comprises.

The following test illustrates the invention.

1) A plastic basin with an area of 0.5 m$^2$ was filled with seawater (fifty litres).

2) A sample of treated pumice stone (comprising 11.60% of carbon by weight) was flamed in order to clearly show that combustion did not happen.

3) One litre of red heating oil was poured into the basin and, subsequently, some three litres of treated pumice stone were dispersed over the surface of the basin so that the grains are fully in contact with the oil.

The latter forms a fine film at the surface of the water (this closely resembles an oil slick).

4) Two minutes after dispersing the pumice stone, the latter was recovered using a metal skimmer and poured into a metal wheelbarrow.

5) Once collecting was complete, the presentation of a flame to the pumice stone initiated the combustion of the adsorbed oil, this lasting some ten minutes.

6) Oil was again poured into the small basin and the pumice stone, already used, was again dispersed over the water.

Creaming off was again carried out and the combustion of the oil was carried out in the metal wheelbarrow.

7) The adsorption was better than the first time (visual examination).

The seawater was separated by settling; its clarity increased.

8) The same operations were resumed fifteen times, decontamination of the oil-contaminated water being obtained each time.

The amount of organic compounds extractable in dichloromethane is between 180 mg and 220 mg per g of pumice stone, as determined by accelerated solvent extraction (ASE 200), which is carried out by liquid-solid extraction at high pressure (200 bar) and high temperature (130° C.). The content of diacids is greater in the surface layer with a thickness of 1 mm than in the core of the pumice stone, as determined by analysis of the silylated polar compounds by GC-MS in the following way:

1.1. Preparation of the Samples

The samples of pumice stones were treated so as to isolate the surfaces and the cores of the pumice stones. To do this, the surfaces were scratched off using a metal file cleaned beforehand with dichloromethane in order to isolate a thickness of the surface of approximately 1 mm. Approximately 20 to 30 pumice stones were treated in this way. The surfaces thus isolated and the residual cores were stored in glass bottles in order to avoid any contamination.

1.2. High-Pressure Extraction

Accelerated solvent extraction (ASE 200) makes it possible to isolate the organic extracts from a solid matrix (insoluble organic matter and inorganic phases). It is based on a liquid-solid extraction using solvents or combinations of solvents in order to extract, at high pressure and high temperature, the extractable organic matter. The high pressures (up to 200 bar) make it possible to keep the solvent in its liquid state. At high temperature, the dissolution of the extracts and the kinetic dissolution process are accelerated in comparison with the solvents used at a lower temperature. This makes possible a reduction in the volumes of solvents used, by virtue of this increase in the solvating capabilities, and a reduction in the extraction working times.

The equipment comprises a steel extraction cell connected to a heating system and a system of pumps which are electronically controlled in order to maintain the temperature and pressure conditions selected.

Before the extraction, a silica filter is inserted at the bottom of the cell in order to prevent particles of sample passing through the system. Glass beads are subsequently introduced into the cell in order to make possible better dispersion of the sample and thus to obtain an optimum extraction yield. The "neutral" cell is subsequently extracted with the same solvent which will be used during the extraction (dichloromethane) in order to make sure that the cells, filter and glass beads are perfectly clean (rinsing). The parameters used during the extractions are presented in Table I.

TABLE I

Rinsing and extraction parameters for the cells of the ASE 200 (the "flush" is the amount of solvent used to rinse the cell (percentage of the volume of the cell)).

|  | Rinsing | Extraction |
| --- | --- | --- |
| Temperature (° C.) | 150 | 130 |
| Pressure (bar) | 100 | 150 |
| Flush (%) | 150 | 150 |
| Static phase (min) | 5 | 5 |

The sample is weighed before being charged in the cell. Each sample extraction takes place according to predefined parameters gathered together in a method (Table I). A method specifies the duration of the heating of the cell, the temperature of the oven, the pressure maintained in the cell and the amount of solvent necessary to rinse the cell (% flush).

Once the extraction has been carried out, the organic extract is reconcentrated using a Turbovap evaporator at a temperature of 35° C. and then dried at ambient temperature under an argon stream in order to prevent oxidation of the compounds.

1.3. Fractionation of the Organic Extracts

The organic extracts obtained are weighed in order to be subsequently fractionated by liquid chromatography on alumina and silica microcolumns into three classes of compounds:

Aliphatic hydrocarbons (also referred to as saturated hydrocarbons)
Aromatic hydrocarbons
Polar compounds The weighings are carried out using a Mettler AT 201 balance with a display accuracy of 0.01 mg.

1.3.1. Activation of the Inorganic Phases

The various inorganic phases used for the fractionation (alumina and silica) were activated. Each inorganic phase (approximately 100 g) is rinsed copiously with cyclohexane and dichloromethane. Subsequently, these phases are placed in an oven (120° C.) overnight.

1.3.2. Alumina Column

The extracts, diluted with dichloromethane, are injected into the microcolumn containing activated alumina. The eluate, composed of a mixture of saturated hydrocarbons, of aromatic hydrocarbons and of a portion of the polar compounds, is recovered in a flask. The remainder of the polar compounds, which have remained trapped at the column top, is eluted with a dichloromethane/methanol (50/50, v/v) mixture. This first phase on an alumina column makes it possible to isolate a complex fraction of the polar compounds (macromolecules) which can interfere with the second stage of separation on a silica column.

1.3.3. Silica Column

The first fraction resulting from the separation on an alumina column is dried and then diluted with n-pentane in order to be injected into the silica microcolumn. The eluate, composed of the saturated hydrocarbons, is recovered in a flask. The aromatic hydrocarbons and the polar compounds remain trapped at the column top. The aromatic hydrocarbons are desorbed using an n-pentane/dichloromethane (65%/35%) mixture and recovered in a flask. The polar compounds are eluted in a methanol/dichloromethane (50%/50%) mixture.

On completion of fractionation, each flask is evaporated at ambient temperature under a gentle stream of argon and again weighed. It is then possible, for each sample, to determine the proportions of the various families of compounds (saturated hydrocarbons, aromatic hydrocarbons and polar compounds).

1.4. Coupled Gas Chromatography-Mass Spectrometry (GC-MS)

The saturated and aromatic hydrocarbons and also the polar compounds were analysed with a Hewlett-Packard HP 5890 series II gas chromatograph coupled to a Hewlett-Packard 5972 mass spectrometer. The injector used is a split-splitless one heated continuously at 300° C. Chromatographic separation is carried out with a DB-5 J&W Scientific fused silica capillary column (length: 60 m, diameter: 0.25 mm; film thickness: 0.1 µm) with a nonpolar phase (5% of phenylmethyl-siloxane) according to the temperature programme: 60° C.-130° C. at 15° C./min, stationary phase of 15 minutes at 300° C. The carrier gas is helium, the flow rate of which remains constant at 1 ml/min throughout the duration of the analysis. The chromatograph is coupled to the mass spectrometer via a transfer line heated to 320° C.

The various organic fractions were analysed in full-scan mode. This mode of analysis makes it possible to record the ions having charges between m/z=50 and 450. This method is used to identify the compounds present. Each chromatographic peak gives rise to a mass spectrum, characteristic of the structure of a compound, composed of the molecular ion and fragments formed during impact with the electrons. The polar compounds are dissolved with the BSTFA, making it possible to carry out a silylation in order to improve the resolution of polar molecules (carboxylic acids, alcohols) capable of being present in this fraction.

The invention claimed is:

1. Pumice stone which has a carbon content of between 5 and 15% by weight, wherein it has a particle size of between 3 and 8 mm and it has a density of less than or equal to 570 kg/m$^3$ and greater than 500 kg/m$^3$.

2. Pumice stone according to claim 1, wherein it has a mean particle size of 6 mm.

3. Pumice stone according to claim 1, wherein it has an SiO$_2$ content ranging from 60 to 70% by weight and an Al$_2$O$_3$ content of approximately 17% by weight, the remainder being heterogeneous products.

4. Process for the production of a pumice stone which has a carbon content of between 5 and 15% by weight, wherein it has a particle size of between 3 and 8 mm and it has a density of less than or equal to 570 kg/m$^3$ and greater than 500 kg/m$^3$, which comprises causing a pumice stone to adsorb a hydrocarbon and igniting the pumice stone which has adsorbed hydrocarbon in order to incinerate the latter, and freeing the pumice stone, before causing it to adsorb a hydrocarbon, from the fines, basalt, magnetite and volcanic ash which obstruct the pores thereof, by projecting jets of water through a sieve on which the pumice stone is deposited.

5. Process for decontaminating a sheet of water contaminated by a hydrocarbon, wherein a pumice stone, which has a carbon content of between 5 and 15% by weight, wherein it has a particle size of between 3 and 8 mm and it has a density of less than or equal to 570 kg/m$^3$ and greater than 500 kg/m$^3$, is spread over the sheet of water, it is left there between two minutes and eight hours (and preferably between three minutes and two hours), then the pumice stone is gathered up and ignited in order to incinerate therefrom the hydrocarbons which it comprises, and these operations are repeated.

6. Process according to claim 5, wherein the pumice stone is spread in a thickness of 1 to 4 cm.

7. The pumice stone of claim 1, which has a carbon content of between 10 and 13% by weight.

* * * * *